UNITED STATES PATENT OFFICE.

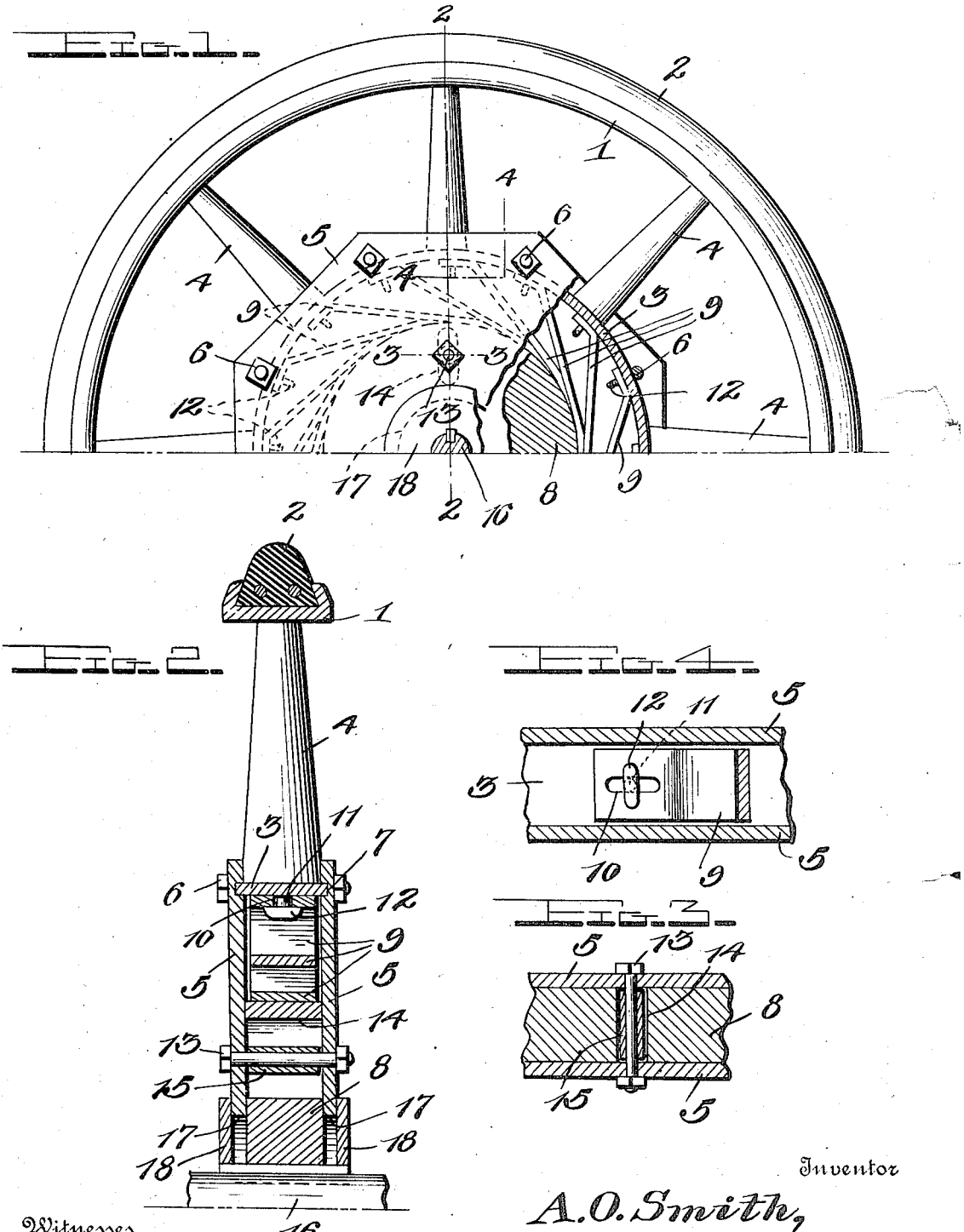

ARTHUR O. SMITH, OF LAKEMP, OKLAHOMA.

SPRING-WHEEL.

1,068,457.  Specification of Letters Patent.  Patented July 29, 1913.

Application filed June 24, 1912. Serial No. 705,604.

*To all whom it may concern:*

Be it known that I, ARTHUR O. SMITH, a citizen of the United States, residing at Lakemp, in the county of Beaver and State of Oklahoma, have invented certain new and useful Improvements in Spring-Wheels, of which the following is a specification, reference being had to the accompanying drawings.

This invention comprehends certain new and useful improvements in spring wheels particularly adapted for automobiles although applicable to other kinds of vehicles.

The object of the invention is to provide a spring wheel comprising an inner rim, an outer rim connected thereto by a plurality of spokes and a hub positioned within the inner rim and spaced therefrom by a number of curved flat metal springs.

The invention also aims to generally improve wheels of this nature to render them stronger, more efficient and more commercially desirable.

With these and other objects in view, as shall become apparent as the description proceeds, the invention consists in certain novel constructions and arrangement of parts, as I shall hereinafter fully describe and claim.

For a complete understanding of the invention, reference is to be had to the following description and accompanying drawing, in which—

Figure 1 is a side elevation of a half wheel constructed in accordance with my invention, the outer side plate being partly broken away. Fig. 2 is a vertical section on the plane of line 2—2 in Fig. 1; Fig. 3 is a horizontal section on the plane of line 3—3 in Fig. 1; Fig. 4 is a sectional view taken on the plane of line 4—4 of Fig. 1.

Similar parts are referred to in the following description and designated in the accompanying drawing by like reference characters.

Referring to the drawing by numerals 1 designates an outer or road rim carrying the tire 2, and held in spaced relationship to an inner rim 3 by a plurality of spokes 4. Octagonal side plates 5 are positioned on opposite sides of the inner rim 3 and secured in position by the bolts 6 which pass through the corners of said side plates and engage the outer surface of the inner rim. Each of the side plates is provided on its inner surface with an annular groove 7 which receives one edge of the inner rim and is for the purpose of holding the rim in proper relationship to the plates. It will be noticed that the side plates project outwardly a slight distance beyond the inner rim and bear against the spokes 4 assisting materially in securing them in position.

A circular hub 8 is loosely retained in the casing formed by the side plates and the inner surface of the inner rim. A plurality of slightly curved springs 9 each being formed with a longitudinal slot 10 in its outer end are secured to the inner surface of the inner rim 3 by a plurality of lugs 11 which extend transversely of the inner rim. Each of the lugs is provided with an enlarged head 12 for the purpose of retaining one of the springs 9 in position thereon. The inner ends of the springs overlap and bear against the periphery of the hub 8 thereby supporting the hub normally concentrically within the rim 3. The springs 9 are not secured in any manner to the hub but rest freely against the periphery thereof so that the movement of said hub within the rim is not restricted in any manner by the springs. The hub is prevented from rotating independently of the remainder of the wheel by a bolt 13 which has its ends secured in the side plates and which passes through a radial slot 14 formed in the hub. In order that the friction produced by the bolt 13 working within the slot 14 may be reduced as much as possible, I provide a roller 15 which is mounted on the bolt 13 and which engages the side walls of the slot.

An axle 16 is keyed to the hub 8 and passes through oppositely disposed central openings 17 formed in the side plates 5. The openings 17 are closed by circular plates 18 which are also keyed to the axle 16 and which bear against the outer sides of the plates 5.

In assembling my improved spring wheel, the springs 9 are secured to the inner rim 3 by slipping the slots formed in their outer ends over the lugs 11 and then turning the springs 9 so that they will lie within the rim 3. This turning action locks the springs 9 on the lugs 11 since it brings the longitudinal slots 10 at right angles to the heads 12 of said lugs. Next the hub 8 is positioned within the rim 3 and then the side plates 5 are bolted in position. The circular plates 18 and the axle 16 are next secured in position and finally the connecting bolt 13 is slipped through the radial slot in the hub, the roller sleeve being previously positioned in said slot, and secured to the side plates 5.

In the operation of my improved wheel, the rotation of the axle and hub is transmitted to the remainder of the wheel by the connecting pin or bolt 13 and since this bolt works within the radial slot the hub is free to move a limited distance from its normal concentric position within the rim 3. The springs 9 are of sufficient strength to support any load which is apt to be placed upon the wheel and since they are connected to the rim 3 by the lug 11 passing through a slot in each spring, they are permitted a slight circumferential movement which will relieve the strain upon them should it become too great.

It is to be understood that while I have shown the preferred embodiment of my invention, slight changes in the construction and arrangement of the parts may be made without departing from the scope or spirit of the invention.

Having thus described the invention, what I claim is:

1. A spring wheel comprising an outer rim, an inner rim, spokes secured between the outer and inner rims, a hub positioned within said inner rim, a plurality of spaced fastening lugs formed integral with the inner face of said last mentioned rim, each of said lugs being formed with an elongated, transversely extending head, a plurality of flat metal springs each of which is formed adjacent one end with a longitudinal slot somewhat longer than the heads of the fastening lugs and whereby said spring may be secured in position, the free ends of said spring bearing loosely against the periphery of the hub, side plates inclosing the inner portion of said wheel and means for connecting the hub to said plates.

2. A spring wheel comprising an outer rim, an inner rim, spokes secured between said rims, a hub loosely positioned within the inner rim, a plurality of spaced fastening lugs formed integral with the inner face of the last mentioned rim and provided with elongated transversely extending heads, a plurality of flat metal springs, each of which is provided at one end with a longitudinal slot of a greater length than the heads of said fastening lugs and whereby the spring may be easily secured thereto, the free ends of said springs overlapping and bearing loosely against the periphery of the hub, side plates removably secured to the inner rim and serving to retain said springs and hub in their proper operative position, and means for connecting the hub to said plates.

In testimony whereof I hereunto affix my signature in the presence of two witnesses.

ARTHUR O. SMITH.

Witnesses:
S. P. SHUEY,
G. W. ALLEN.

---

Copies of this patent may be obtained for five cents each, by addressing the "Commissioner of Patents, Washington, D. C."